(12) United States Patent  (10) Patent No.: US 12,179,662 B2
Puig-Pey et al.  (45) Date of Patent: Dec. 31, 2024

(54) ILLUMINABLE INDICATION SYSTEM AND METHOD FOR MANUFACTURING ILLUMINABLE INDICATION SYSTEM

(71) Applicant: Lear Corporation, Southfield, MI (US)

(72) Inventors: Jeanette Puig-Pey, Bloomfield Hills, MI (US); Louella Patterson, Goodells, MI (US); Mike Powell, Waterford, MI (US); Paul Severinski, Brownstown, MI (US); Samuel Hanlon, Livonia, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 18/173,329

(22) Filed: Feb. 23, 2023

(65) Prior Publication Data

US 2023/0398928 A1 Dec. 14, 2023

Related U.S. Application Data

(60) Provisional application No. 63/366,380, filed on Jun. 14, 2022.

(51) Int. Cl.
*B60Q 3/56* (2017.01)
*B60Q 3/233* (2017.01)
*F21V 23/00* (2015.01)
*F21V 23/06* (2006.01)
*F21Y 115/10* (2016.01)

(52) U.S. Cl.
CPC ............... *B60Q 3/56* (2017.02); *B60Q 3/233* (2017.02); *F21V 23/003* (2013.01); *F21V 23/06* (2013.01); *F21Y 2115/10* (2016.08)

(58) Field of Classification Search
CPC . B60Q 3/56; B60Q 3/233; B60Q 3/54; B60Q 3/62; B60Q 3/64; F21V 23/003; F21V 23/06; F21Y 2115/10
See application file for complete search history.

(56) References Cited

U.S. PATENT DOCUMENTS

| 5,193,895 A | 3/1993 | Naruke et al. |
| 6,864,312 B2 * | 3/2005 | Moore ............... C08G 18/6629 524/591 |
| 10,562,605 B2 * | 2/2020 | Ibrahim ................. B64D 11/00 |
| 11,794,642 B2 * | 10/2023 | Vanluchene ........... B60K 37/06 |

(Continued)

FOREIGN PATENT DOCUMENTS

| CN | 111703381 A | * | 9/2020 | ........... B32B 27/065 |
| DE | 102005003132 A1 | * | 3/2006 | ............. B60Q 3/004 |

OTHER PUBLICATIONS

DE 102005003132, Walter Mechling, Mar. 2, 2006, English Translation (Year: 2006).*

(Continued)

*Primary Examiner* — Peggy A Neils
(74) *Attorney, Agent, or Firm* — Brooks Kushman P.C.

(57) ABSTRACT

The present disclosure provides an illuminable indication system that includes a light emitting diode (LED) assembly including at least one LED, and a flexible member at least partially covering the LED assembly, the flexible member including a translucent portion, wherein when illuminated by the at least one LED, the translucent portion provides an illuminated indication to a user.

17 Claims, 4 Drawing Sheets

(56) References Cited

U.S. PATENT DOCUMENTS

| | | |
|---|---|---|
| 2007/0153535 A1 | 7/2007 | Bostick |
| 2014/0211498 A1* | 7/2014 | Cannon ................. B60Q 3/217 |
| | | 362/555 |
| 2015/0274068 A1* | 10/2015 | Falconi ................. B60Q 3/233 |
| | | 297/217.6 |
| 2015/0307033 A1 | 10/2015 | Preisler et al. |
| 2018/0245754 A1 | 8/2018 | Gensler et al. |
| 2019/0016262 A1 | 1/2019 | Thiebaud |
| 2019/0225143 A1* | 7/2019 | Severinski ............... B60N 2/58 |
| 2023/0273364 A1* | 8/2023 | Dillinger ................ B60Q 3/233 |
| | | 362/511 |

OTHER PUBLICATIONS

CN 111703381, Zhi-hui Chen, Sep. 25, 2020, English Translation (Year: 2020).*
International Search Report and Written Opinion for Application No. PCT/US/2023/017350, dated Jun. 21, 2023, 10 Pages.

* cited by examiner

ILLUMINABLE INDICATION SYSTEM AND METHOD FOR MANUFACTURING ILLUMINABLE INDICATION SYSTEM

CROSS-REFERENCE TO RELATED APPLICATIONS

This application claims the benefit of U.S. Provisional Application Ser. No. 63/366,380 filed on Jun. 14, 2022, the disclosure of which is hereby incorporated by reference herein in its entirety.

TECHNICAL FIELD

The following relates to an illuminable indication system and a method for manufacturing an illuminable indication system.

DETAILED DESCRIPTION

It is noted that detailed non-limiting embodiments are disclosed herein. However, it is to be understood that the disclosed embodiments are merely exemplary and may take various and alternative forms. The figures are not necessarily to scale, and features may be exaggerated or minimized to show details of particular components. Therefore, specific structural and functional details disclosed herein are not to be interpreted as limiting, but merely as a representative basis for teaching one skilled in the art.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

As used herein, "one or more" and/or "at least one" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a" "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

With reference to the Figures, a more detailed description of non-limiting exemplary embodiments of an illuminable indication system and a method for manufacturing an illuminable indication system will be provided. For ease of illustration and to facilitate understanding, like reference numerals may be used herein for like components and features throughout the drawings.

It is known to provide interior vehicle components, such as dashboards or door panels, with identifying markers or badges, which may for example represent a corporate logo. Such badges are formed from hard plastic material which may be extruded into the vehicle component. Lights or lamps may be configured to cooperate with the badge to provide it with an illuminated appearance.

However, being formed from hard plastic material, such badges are not well suited for use in or on vehicle seating components in areas where user comfort is important. In that regard, to the extent employed in or on vehicle seating components, such badges must be relatively small in size to minimize user comfort issues.

As described herein, the present disclosure provides an improved illuminable indication system and a method for manufacturing an illuminable indication system that solves, mitigates, overcomes, and/or addresses the problems described above associated with hard plastic badges. In that regard, the present disclosure describes a light emitting diode (LED) light-through silicone applique, such as for a vehicle seating application.

More particularly, the present disclosure describes an unique silicone applique that is laser etched to create a light read-through feature that permits and/or enables light emitted by one or more LEDs to at least partially pass through and illuminate at least a portion, section, or area of the silicon applique a provide an indication to a user. The silicon applique is sewn to a trim cover material for a vehicle headrest or seat back where the flexible nature of the silicon promotes and/or does not interfere with user comfort.

Figure 1A:
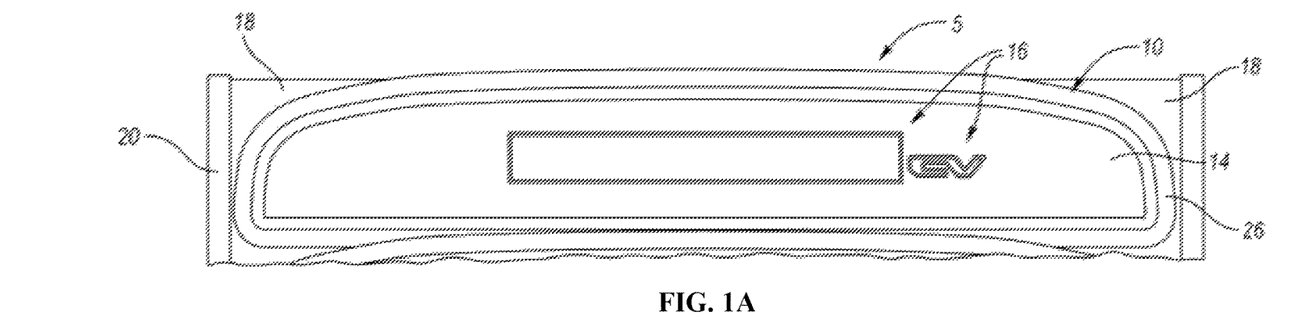
FIGS. 1A-1E are exemplary depictions of non-limiting exemplary embodiments of an illuminable indication system according to the present disclosure.
Figure 1B:
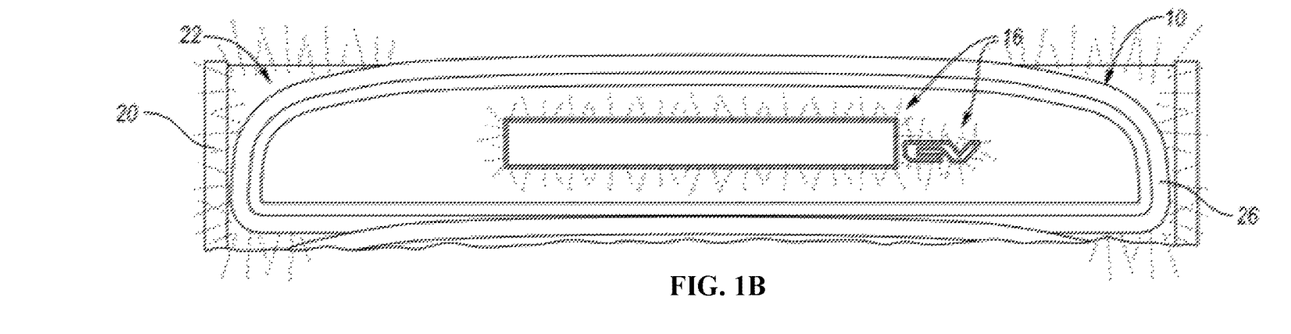
Figure 1C:
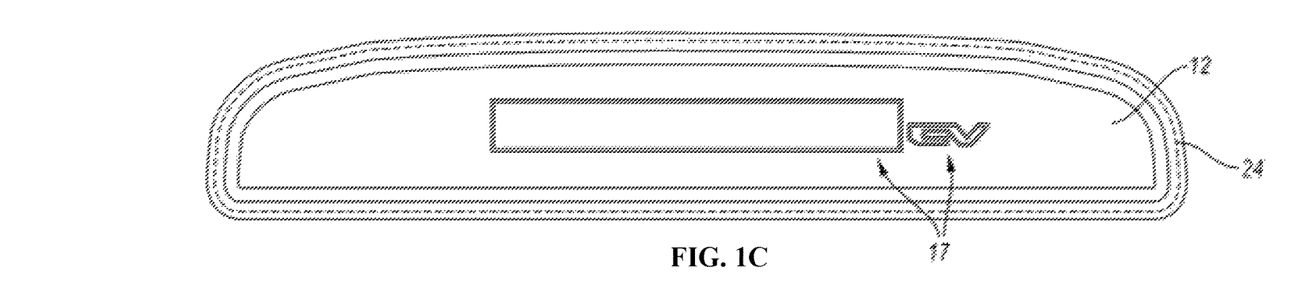

In that regard, FIGS. 1A-1E are exemplary depictions of non-limiting exemplary embodiments of an illuminable indication system 5 according to the present disclosure. As seen therein, a flexible member 10 is formed from silicon or a silicon-based material (i.e., silicon with any known additives). As seen in FIGS. 1B and 1C, the flexible member 10 takes the form of a sheet, layer, or film, and has an elongated panel or shield-like shape similar to the shape of a vehicle trim cover material 12. It is noted, however, that the flexible member 10 make take or be provided with any desired shape suitable for its intended location or application, subject only to mechanical or physical restrictions or limitations associated with its attachment to a trim cover material.

The surface 14 of the flexible member 10 includes a portion 16 that is laser etched to create a light read-through feature. In that regard, laser etching of the portion 16 of the flexible member 10 acts to thin a dimension (e.g., a thickness) of the silicon in the portion 16 and thereby creates a translucent area through which light is at least partially visible, such as when transmitted or emitted by an LED. Such laser etching of the flexible member 10 may be used to create a translucent portion 16 having a configuration representing at least one alphanumeric character and/or a graphical image, such as a corporate mark or logo. As seen in FIGS. 1A and 1B, the translucent portion 16 includes letters that have been laser etched into or on the flexible member 10. While the letters "EV" are shown, any alphanumeric character or characters may be used. The translucent portion 16 located on the flexible member 10 adjacent the letters "EV" may also be laser etched to create additional alphanumeric characters and/or graphical images (not shown). In that regard, it is noted that the translucent portion 16 created on the flexible member 10 by laser etching may be located anywhere on the surface 14 of the flexible member 10, including multiple locations that may be contiguous or non-contiguous. It is also noted that, in addition to laser etching, the surface 14 of the flexible member 10 may be painted in the translucent portion 16 to provide multi-colored variants. As well, multi-colored variants may be provided by using and/or combining LEDs 20 that emit different color light. It is further noted that, as an alternative or in addition to laser etching, other means or methods, such as scoring, marking, flattening, or thinning of the flexible member 10 may be employed to form the translucent portion 16 and/or any alphanumeric character(s) and/or graphical image(s). It is still further noted that the flexible member 10 or a portion of the flexible member 10, such as the translucent portion 16, may alternatively or further comprise a thermoplastic polyurethane (TPU) film (not shown) located on the top of the alphanumeric character(s) and/or graphical image(s) (e.g., logo), and/or a polyurethane filler (not shown) for the back portion of such alphanumeric character(s) and/or graphical image(s) (e.g., logo).

As seen in FIGS. 1A and 1B, a flexible panel 18 is provided behind the flexible member 10. The flexible panel 18 supports one or more LEDs 20 along at least one end thereof. The LEDs 20 and the flexible panel 18 are configured such that, when activated, energized, or illuminated, the LEDs 20 emit light 22 that is transmitted or propagates through and illuminates the flexible panel 18. In turn, the light 22 emitted by the LEDs 20 and transmitted through the flexible panel 18 is also emitted from the flexible panel 18 and passes through the translucent area or portion 16 of the silicon flexible member 10. In that regard, FIG. 1B depicts an illuminated translucent area or portion 16 (e.g., including or containing at least the letters "EV"), in contrast to a translucent area or portion 16 in FIG. 1A that is not illuminated.

As seen in FIG. 1C, a vehicle seat trim cover material 12 is sewn 24 to the silicon flexible member 10. In that regard, the silicon flexible member 10 is provided with a flange 26 at or around the edge thereof. The flange 26 acts or serves as an attachment feature to which the vehicle seat trim cover material 12 is sewn 24. It is noted that the trim cover material 12 is also provided with a translucent area or portion 17 corresponding to the translucent area or portion 16 of the flexible member 10. As a result, when the translucent area or portion 16 of the flexible member 10 is illuminated by light 22 emitted by the LEDs 20, the corresponding translucent area or portion 17 of the trim cover material 12 is likewise illuminated and thus visible to a user or occupant of the vehicle. It is also noted that, while shown in FIG. 1C sewn to a vehicle seat trim cover material 12, the unique sewn on laser etched flexible silicon applique of the present disclosure may alternatively be used in, on, or at any location in the vehicle interior. Moreover, while shown as sewn, the trim cover material 12 may alternatively be attached to the flexible member in other known ways, such as by an adhesive or by sonic welding.

Figure 1D:
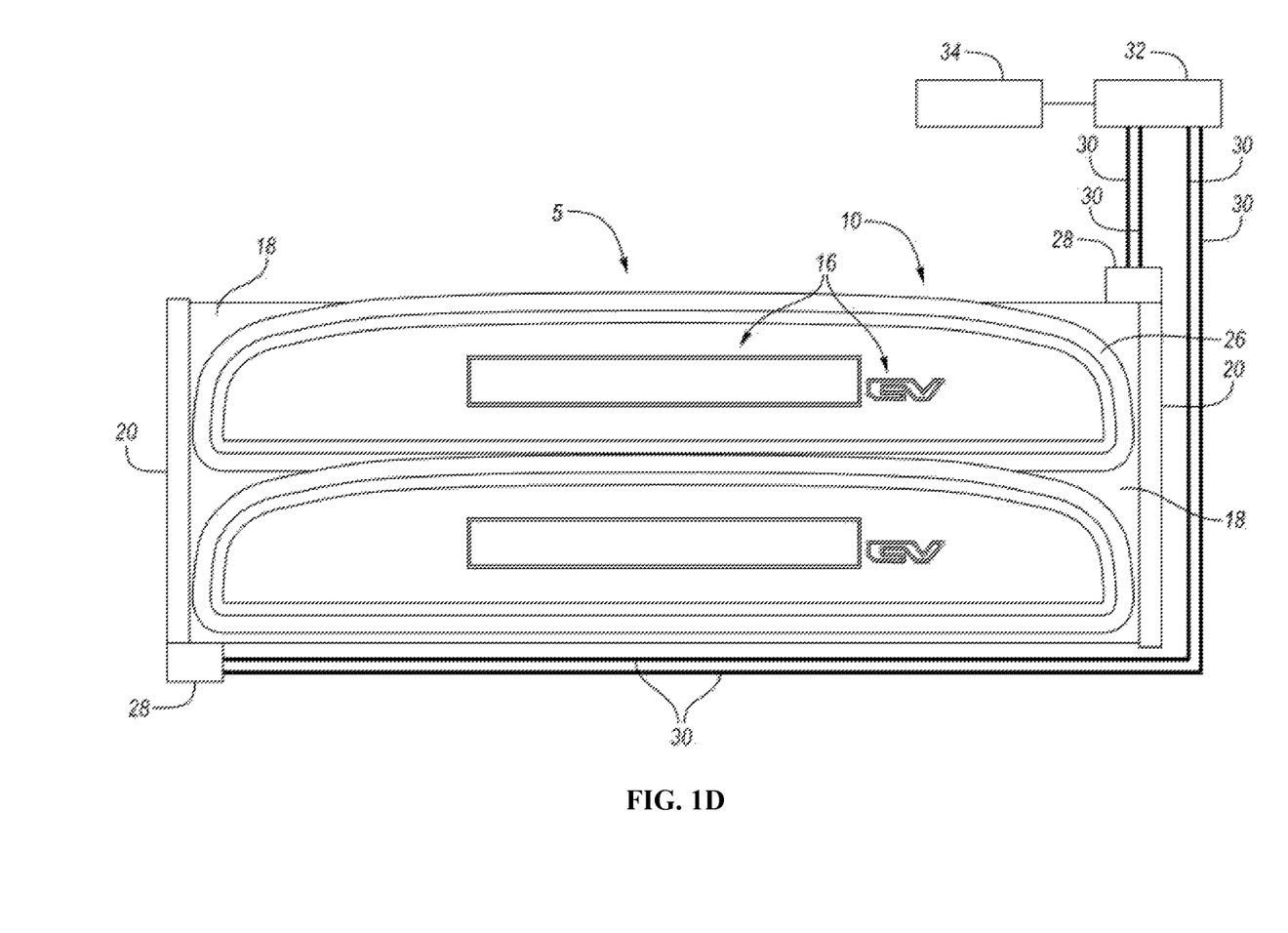
Figure 1E:
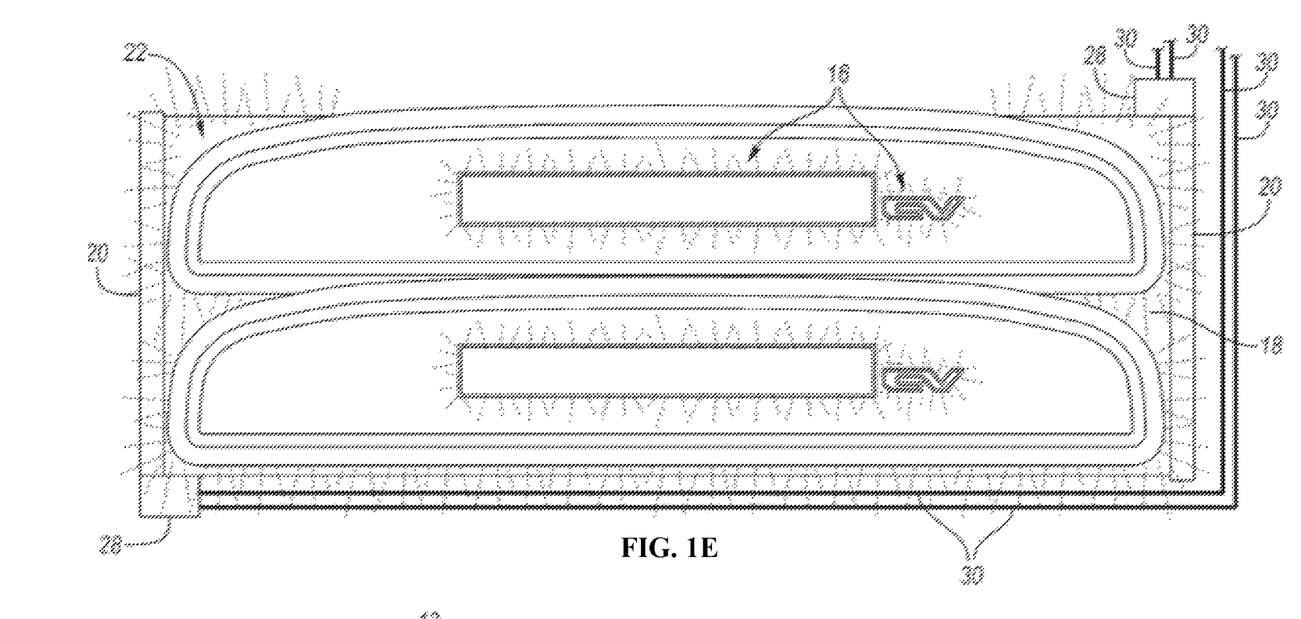

As seen in FIGS. 1D and 1E, the flexible member 10 of the silicon applique of the present disclosure is again backed by a flexible panel 18 supporting one or more light emitting diodes (LEDs) 20 at one or more ends of the panel 18. As previously described, the LEDs 20, when energized, illuminate the light read-through feature or translucent portion 16 of the flexible member 10 (see FIG. 1E). One or more electrical connectors 28 and electrical wires or conductors 30 serve to supply electrical power and/or control signals to the LEDs 20. It is noted that the LEDs 20 are part of an LED assembly, which may comprise the flexible panel 18, one or more electrical connectors 28, and/or one or more electrical wires or conductors 30. In that regard, the flexible member 10 at least partially covers the LED assembly. It is also noted that the one or more LEDs 20 may alternatively be one or more point LEDs and the flexible panel 18 may be omitted.

The electrical connectors 28 and electrical conductors 30 connect the LEDs 20 to an electrical power source 32, which may be a transformer or a low voltage battery, such as a 12-volt vehicle battery, which is provided in communication with a controller, control unit, or control system 34, which may comprise one or more processors appropriately programmed for controlling activation/deactivation of the LEDs 20. In that regard, the power source 32 and controller 34 may be located anywhere in the vehicle, such as at, in, or on a vehicle seat assembly. The control system 34 may also control the at least one LED 20 to provide information to a vehicle occupant or user through illumination of the translucent portion 16. For example, the at least one LED 20 may be activated and deactivated repeatedly, in a flashing fashion, by the control system 34 to provide status information, which may take the form of a warning, regarding a vehicle system to a vehicle user or occupant. The at least one LED 20 may also or alternatively be tied to internal vehicle lighting, or may be controlled by the control system 34 to provide changing or different colored lighting effects.

Figure 2:
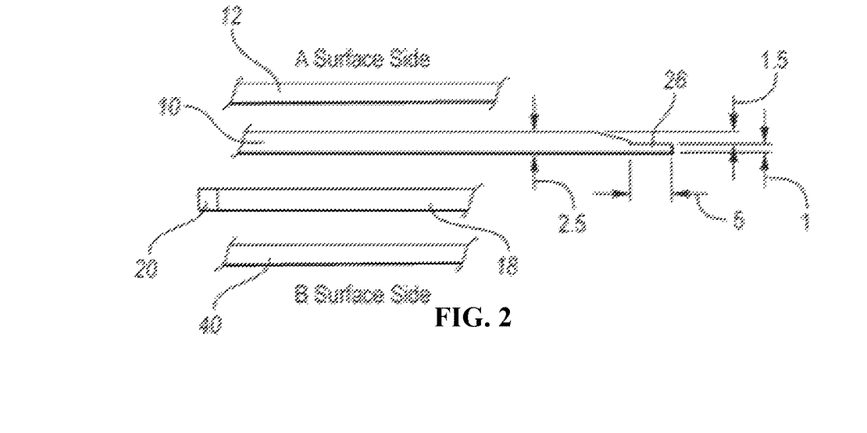
FIG. 2 is an exemplary simplified diagram illustrating a partial exploded side-view of a non-limiting exemplary embodiment of an illuminable indication system according to the present disclosure.

FIG. 2 is an exemplary simplified diagram illustrating a partial exploded side-view of a non-limiting exemplary embodiment of an illuminable indication system according to the present disclosure. As seen therein, and similar to the embodiments depicted in FIGS. 1A-1E, a flexible member 10 is formed from silicon or a silicon-based material (i.e., silicon with any known additives), and takes the form of a sheet, layer, or film. A flexible panel 18 is provided behind the flexible member 10. The flexible panel 18 supports one or more LEDs 20 along at least one end thereof. The LEDs 20 and the flexible panel 18 are configured such that, when activated, energized, or illuminated, the LEDs 20 emit light 22 that is transmitted or propagates through and illuminates the flexible panel 18. The silicon flexible member 10 is provided with a flange 26 at or around the edge thereof. The flange 26 acts or serves as an attachment feature to which the vehicle seat trim cover material 12 is sewn (see FIG. 1C) at an A side surface of a vehicle seat (not shown).

As seen in FIG. 2, the sheet, layer, or film flexible member 10 has a thickness of 2.5 millimeters. The flange 26 has a thickness of 1 millimeter and a width of 5 millimeters. It should be noted, however, that the dimensions shown are exemplary only, and the flexible member 10 and flange 26 may be provided with alternative thicknesses and width, or any other dimensions, as desired, appropriate, or required for a particular application, including sewing requirements and/or limitations.

As also seen in FIG. 2, a foam member or backing layer 40 is also provided at a B side surface of the vehicle seat (not shown). In such a fashion, a vehicle seat component is provided that comprises a foam member 40, a trim cover material 12, and an indication system 5 as described herein, with a flexible member 10, flexible panel 18, and one or more LEDs 20. In that regard, the flexible nature of the flexible member 10, flexible panel 18, and foam backing 40 cooperate and provide a vehicle seat component that promotes and/or does not interfere with user comfort.

Figure 3:
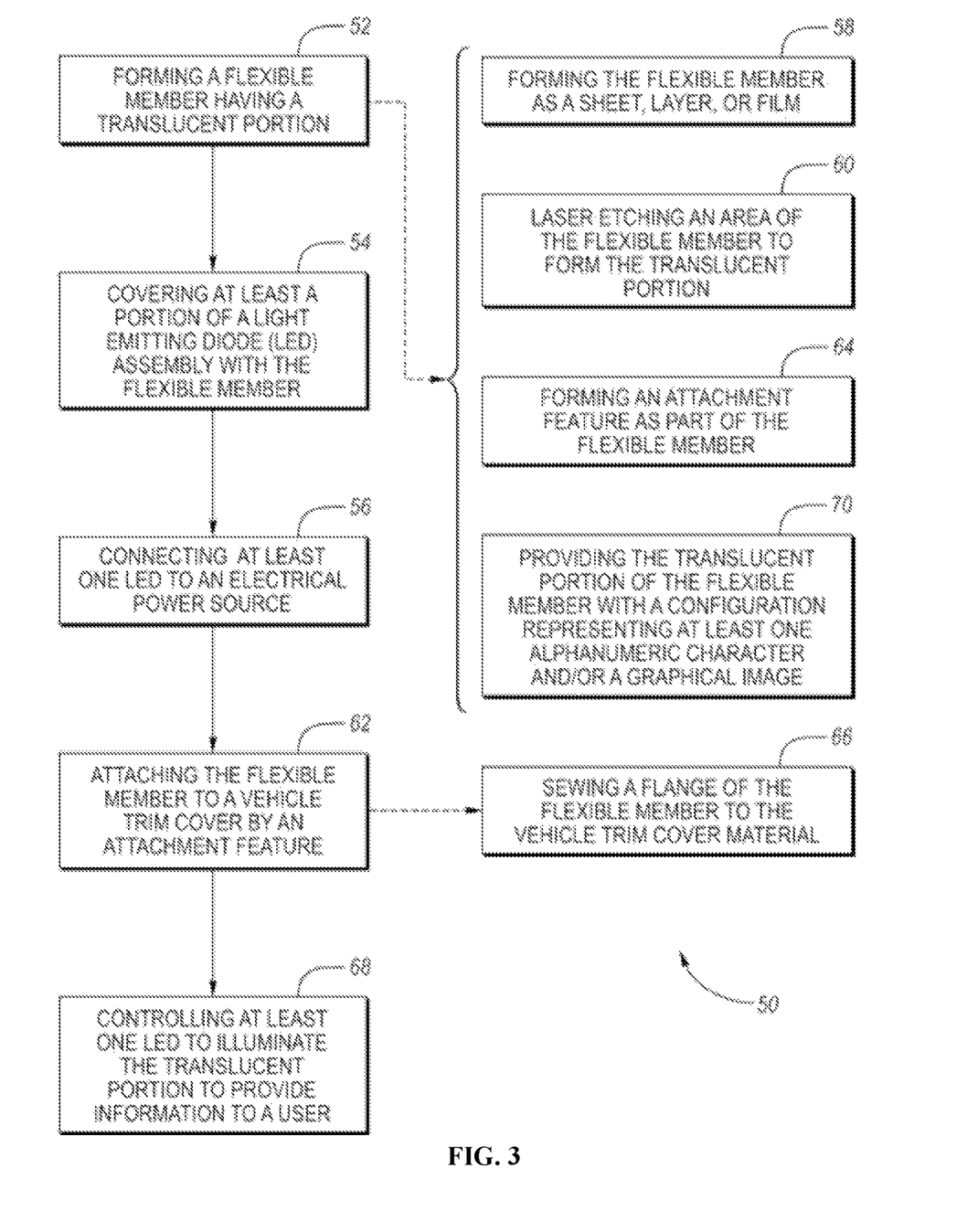
FIG. 3 is an exemplary flowchart illustrating a non-limiting exemplary embodiment of a method for manufacturing an illuminable indication system according to the present disclosure.

FIG. 3 is an exemplary flowchart illustrating a non-limiting exemplary embodiment of a method 50 for manufacturing an illuminable indication system 5 according to the present disclosure. In the embodiment shown, and with continuing reference to FIGS. 1A-1E and 2, the method 50 comprises forming 52 a flexible member 10 having a translucent portion 16 permitting light to pass through, and covering 54 at least a portion of a light emitting diode (LED) assembly with the flexible member, the LED assembly including at least one LED, wherein when illuminated by the at least one LED the translucent portion 16 provides an illuminated indication to a user.

In that regard, the LED assembly may include an electrical conductor 30, an electrical connector 28, and a flexible panel 18 supporting the at least one LED 20, and the method further comprises connecting 56 the at least one LED 20 to an electrical power source 34 by the electrical conductor 30 and electrical connector 28.

Referring still to FIG. 3, the flexible member 10 comprises a silicon or silicon-based material and forming 52 the flexible member 10 may comprise forming 58 the flexible member 10 as a sheet, layer, or film. The method 50 may further comprise laser etching 60 an area of the flexible member 10 to form the translucent portion 16.

Still further, and with continuing reference to FIGS. 1A-1E and 2, the method 50 may further comprise attaching 62 the flexible member 10 to a vehicle trim cover material 12 by an attachment feature 26. In that regard, the method 50 may further comprise forming 64 the attachment feature 26 as part of the flexible member 10. More particularly, the attachment feature 26 may comprise a flange 26 and attaching 62 the flexible member 10 to a vehicle trim cover material 12 may comprise sewing 66 the flange 26 to the vehicle trim cover material 12, which may comprise a vehicle seat trim cover material.

The method may further comprise controlling 68, such as via controller 34, the at least one LED 20 to illuminate the translucent portion 16 of the flexible member 10 to provide information to a vehicle occupant or user. For example, the at least one LED 20 may be activated and deactivated repeatedly, in a flashing fashion, to provide information to an occupant or user regarding a vehicle system, as previously described.

Still referring to FIG. 3, and with continuing reference to FIGS. 1A-1E and 2, the method 50 may further comprise providing 70 the translucent portion 16 of the flexible member with a configuration representing at least one alphanumeric character and/or a graphical image. In that regard, laser etching 60 an area of the flexible member 10 to form the translucent portion may comprise laser etching an area of the flexible member to create one or more alphanumeric characters and/or a graphical images, such as a corporate logo or mark.

Clause 1: According to an embodiment, the present disclosure provides an illuminable indication system comprising a light emitting diode (LED) assembly including at least one LED, and a flexible member at least partially covering the LED assembly, the flexible member including a translucent portion, wherein when illuminated by the at least one LED, the translucent portion provides an illuminated indication to a user.

Clause 2: In another embodiment, the present disclosure provides the indication system according to Clause 1 wherein the LED assembly includes a flexible panel, an electrical conductor, and an electrical connector, wherein the at least one LED is supported by the flexible panel and connected to an electrical power source by the electrical conductor and electrical connector.

Clause 3: In another embodiment, the present disclosure provides the indication system according to Clause 1 or Clause 2 wherein the flexible member comprises a silicon or silicon-based material, a thermoplastic polyurethane material, and/or a polyurethane material formed as a sheet, layer, or film.

Clause 4: In another embodiment, the present disclosure provides the indication system according to any of Clauses 1-3 wherein the translucent portion comprises an area of the flexible member that is laser etched, scored, marked, flattened, or thinned.

Clause 5: In another embodiment, the present disclosure provides the indication system according to any of Clauses 1-4 wherein the flexible member includes an attachment feature, and wherein the flexible member is attached to a vehicle trim cover material by the attachment feature.

Clause 6: In another embodiment, the present disclosure provides the indication system according to any of Clauses 1-5 wherein the attachment feature comprises a flange sewn, adhered, or welded to the vehicle trim cover material.

Clause 7: In another embodiment, the present disclosure provides the indication system according to any of Clauses 1-6 wherein the vehicle trim cover material comprises a vehicle seat trim cover material.

Clause 8: In another embodiment, the present disclosure provides the indication system according to any of Clauses 1-7 further comprising a control system, wherein the at least one LED is controlled by the control system to provide information to a user through illumination of the translucent portion.

Clause 9: In another embodiment, the present disclosure provides the indication system according to any of Clauses 1-8 wherein the translucent portion of the flexible member has a configuration representing at least one alphanumeric character and/or a graphical image.

Clause 10: In another embodiment, the present disclosure provides a vehicle seat component comprising a foam member, a trim cover material; and an indication system according to any of Clauses 1-9, the indication system located intermediate the foam member and the trim cover material.

Clause 11: According to an embodiment, the present disclosure provides method comprising forming a flexible member having a translucent portion permitting light to pass through, and covering at least a portion of a light emitting diode (LED) assembly with the flexible member, the LED assembly including at least one LED, wherein when illuminated by the at least one LED, the translucent portion provides an illuminated indication to a user.

Clause 12: In another embodiment, the present disclosure provides the method according to Clause 11 wherein the LED assembly includes an electrical conductor, an electrical connector, and a flexible panel supporting the at least one LED, the method further comprising connecting the at least one LED to an electrical power source by the electrical conductor and electrical connector.

Clause 13: In another embodiment, the present disclosure provides the method according to Clause 11 or Clause 12 wherein the flexible member comprises a silicon or silicon-based material, a thermoplastic polyurethane material, and/or a polyurethane material, and wherein forming comprises forming the flexible member as a sheet, layer, or film.

Clause 14: In another embodiment, the present disclosure provides the method according to any of Clauses 11-13 further comprising laser etching, scoring, marking, flattening, or thinning an area of the flexible member to form the translucent portion.

Clause 15: In another embodiment, the present disclosure provides the method according to any of Clauses 11-14 further comprising forming an attachment feature as part of the flexible member.

Clause 16: In another embodiment, the present disclosure provides the method according to any of Clauses 11-15 further comprising attaching the flexible member to a vehicle trim cover by the attachment feature.

Clause 17: In another embodiment, the present disclosure provides the method according to any of Clauses 11-16 wherein the attachment feature comprises a flange and attaching comprises sewing, adhering, or welding the flange to the vehicle trim cover material.

Clause 18: In another embodiment, the present disclosure provides the method according to any of Clauses 11-17 wherein the vehicle trim cover material comprises a vehicle seat trim cover material.

Clause 19: In another embodiment, the present disclosure provides the method according to any of Clauses 11-18 further comprising controlling the at least one LED to illuminate the translucent portion to provide information to a user.

Clause 20: In another embodiment, the present disclosure provides the method according to any of Clauses 11-19 further comprising providing the translucent portion of the flexible member with a configuration representing at least one alphanumeric character and/or a graphical image.

As is readily apparent from the foregoing, various non-limiting embodiments of an illuminable indication system and a method for manufacturing an illuminable indication system have been described. While various embodiments have been illustrated and described herein, they are exemplary only and it is not intended that these embodiments illustrate and describe all those possible. Additionally, unless the context clearly indicates otherwise, the various features, elements, components, methods, procedures, steps, and/or functions of various implementing embodiments may be combined or utilized in any combination or combinations and/or may be performed in any order other than those specifically described herein to form further embodiments according to the present disclosure. The words used herein are therefore words of description rather than limitation, and it is understood that various changes may be made to these embodiments without departing from the spirit and scope thereof

What is claimed is:

1. An illuminable indication system, comprising:
   a light emitting diode (LED) assembly including at least one LED; and
   a flexible member partially covering the LED assembly and attached to a vehicle seat trim cover material, the flexible member including a translucent portion that is one of laser etched, scored, flattened, or thinned,
   wherein the vehicle seat trim cover material comprises a translucent area corresponding to the translucent portion of the flexible member, and
   wherein when illuminated by the at least one LED, the translucent portion provides an illuminated indication to a user.

2. The indication system according to claim 1, wherein the LED assembly includes a flexible panel, an electrical conductor, and an electrical connector, and wherein the at least one LED is supported by the flexible panel and connected to an electrical power source by the electrical conductor and electrical connector.

3. The indication system according to claim 1, wherein the flexible member comprises at least one of a silicon or silicon-based material, a thermoplastic polyurethane material, and a polyurethane material formed as a sheet, layer, or film.

4. The indication system according to claim 1, wherein the flexible member includes an attachment feature, and wherein the flexible member is attached to the vehicle seat trim cover material by the attachment feature.

5. The indication system according to claim 4, wherein the attachment feature comprises a flange that is one of sewn, adhered, or welded to the vehicle seat trim cover material.

6. The indication system according to claim 1, further comprising a control system, wherein the at least one LED is controlled by the control system to provide information to the user through illumination of the translucent portion.

7. The indication system according to claim 1, wherein the translucent portion of the flexible member has a configuration representing at least one alphanumeric character and a graphical image.

8. A vehicle seat component, comprising:
   a foam member;
   a trim cover material; and
   an indication system according to claim 1, the indication system located intermediate the foam member and the trim cover material.

9. A method, comprising:
   forming a flexible member having a translucent portion permitting light to pass through;
   covering a portion of a light emitting diode (LED) assembly with the flexible member, the LED assembly including at least one LED;
   attaching a vehicle seat trim cover material to the flexible member, wherein the vehicle seat trim cover material comprises a translucent area corresponding to the translucent portion of the flexible member;
   wherein when illuminated by the at least one LED, the translucent portion that is one of laser etched, scored, flattened, or thinned, provides an illuminated indication to a user.

10. The method according to claim 9, wherein the LED assembly includes an electrical conductor, an electrical connector, and a flexible panel supporting the at least one LED, and wherein the method further comprising connecting the at least one LED to an electrical power source by the electrical conductor and electrical connector.

11. The method according to claim 9, wherein the flexible member comprises at least one of a silicon or silicon-based material, a thermoplastic polyurethane material, and a polyurethane material, and wherein forming comprises forming the flexible member as a sheet, layer, or film.

12. The method according to claim 9, further comprising forming an attachment feature as part of the flexible member.

13. The method according to claim 12, further comprising attaching the flexible member to the vehicle trim cover material by the attachment feature.

14. The method according to claim 13, wherein the attachment feature comprises a flange and attaching via sewing, adhering, or welding, the flange to the vehicle seat trim cover material.

15. The method according to claim 9, further comprising controlling the at least one LED to illuminate the translucent portion to provide information to the user.

16. The method according to claim 9, further comprising providing the translucent portion of the flexible member with a configuration representing at least one alphanumeric character and a graphical image.

17. The indication system according to claim 6, wherein the at least one LED is activated or deactivated by the control system to provide different flashing patterns or colored lighting effects.

* * * * *